United States Patent
Irmisch

(10) Patent No.: US 8,206,093 B2
(45) Date of Patent: Jun. 26, 2012

(54) GAS TURBINE WITH A GAP BLOCKING DEVICE

(75) Inventor: Stefan Irmisch, Niederrohrdorf (CH)

(73) Assignee: Siemens Aktiengesellschaft, Munich (DE)

( * ) Notice: Subject to any disclaimer, the term of this patent is extended or adjusted under 35 U.S.C. 154(b) by 1234 days.

(21) Appl. No.: 11/920,674

(22) PCT Filed: Mar. 21, 2006

(86) PCT No.: PCT/EP2006/060892
§ 371 (c)(1),
(2), (4) Date: Nov. 19, 2007

(87) PCT Pub. No.: WO2006/131405
PCT Pub. Date: Dec. 14, 2006

(65) Prior Publication Data
US 2009/0166988 A1    Jul. 2, 2009

(30) Foreign Application Priority Data
Jun. 8, 2005  (EP) .................................. 05012349

(51) Int. Cl.
*F01D 25/24* (2006.01)

(52) U.S. Cl. ................ 415/173.7; 60/752; 60/805

(58) Field of Classification Search ............... 415/173.7, 415/174.3, 229; 60/800, 804, 805, 752
See application file for complete search history.

(56) References Cited

U.S. PATENT DOCUMENTS

| | | |
|---|---|---|
| 3,938,906 A | 2/1976 | Michel et al. |
| 4,103,903 A | 8/1978 | Capriotti et al. |
| 4,196,912 A | 4/1980 | Quitberg |
| 5,340,273 A | 8/1994 | Rockwood |
| 5,400,586 A * | 3/1995 | Bagepalli et al. ............ 60/800 |
| 2005/0063816 A1 | 3/2005 | Jorgensen |

* cited by examiner

*Primary Examiner* — Edward Look
*Assistant Examiner* — Dwayne J White

(57) ABSTRACT

There is described a gas turbine with a channel wall that limits a flow, said channel wall comprising first and second wall sections, one of the wall sections being part of a combustion chamber of the gas turbine and the other wall section being part of an annular hot gas channel of a turbine unit, and the two adjacent wall sections facing each other with a gap there between. In order to reduce the leakage quantities of blocking gas that protect the gap from the entry of hot gas, it is proposed that blocking element projects from the side of the first wall section into the gap and can be displaced transversely thereto, said blocking element comprising a piston face disposed in the first wall section and a sealing structure lying opposite the piston face, it being possible to press said sealing means against an end sealing section of the second wall section by means of a pressure medium that acts on the piston face.

14 Claims, 3 Drawing Sheets

GAS TURBINE WITH A GAP BLOCKING DEVICE

CROSS REFERENCE TO RELATED APPLICATIONS

This application is the US National Stage of International Application No. PCT/EP2006/060892, filed Mar. 21, 2006 and claims the benefit thereof. The International Application claims the benefits of European application No. 05012349.6 EP filed Jun. 8, 2005, both of the applications are incorporated by reference herein in their entirety.

FIELD OF INVENTION

The invention relates to a gas turbine with a passage wall which delimits a flow and which has a first and a second wall section, wherein one of the wall sections is part of a combustion chamber of the gas turbine, and the other of the wall sections is part of an annular hot gas passage of a turbine unit, and wherein the two adjacent wall sections lie opposite each other on the end face side, forming a gap.

BACKGROUND OF INVENTION

It is known that in gas turbines a fuel-air mixture is combusted in a combustion chamber, producing a hot gas, which is then used in a turbine unit for producing mechanical energy. In doing so, the hot gas is transferred from a combustion chamber into an annular hot gas passage, in which turbine stator blades which are arranged on the casing, and turbine rotor blades which are arranged on the rotor, bring about the conversion of the flow energy of the hot gas into mechanical energy of the rotor. In the transition region between combustion chamber and annular hot gas passage, there is an encompassing axial gap which is construction-dependent, the gap dimension of which varies on account of the temperature-dependent expansions which occur during operation of the gas turbine, and which gap is protected against the penetration of hot gas by blowing out sealing air. Sealing air is especially blown out in the gap which is formed between the end of the combustion chamber which faces the hot gas passage, and the platforms of stator blades of the first turbine stage, or a component between combustion chamber and stator blade.

This method for blocking the gap by blowing out sealing air negatively affects the efficiency of the gas turbine, and also affects the combustion stability inside the combustion chamber, since the sealing air is extracted from the compressor air which is made available for combustion. Especially as a result of different thermal expansions of the components which are associated with the gap, the resulting gap varies compared with that in the cold state of the gas turbine. This requires significant mass flows of sealing air, since these are designed for the largest possible gap which occurs. If a still larger gap than that calculated occurs, in the worst case an inadequate sealing can occur which leads to a local hot gas penetration or hot gas entry into the gap, which leads to a reduced service life of the components which encompass the gap.

SUMMARY OF INVENTION

It is an object of the invention, therefore, to disclose a gas turbine with a gap blocking device for a passage wall which delimits a flow, which gas turbine has a further improved efficiency and which has a further improved combustion stability, and also the passage wall of which has an increased service life.

The object which is related to the generic-type gas turbine is achieved in conformance with the features which are disclosed in an independent claim. It is disclosed a blocking element, which, for sealing the gap, extends into the gap and is displaceable transversely to it, projecting from the first wall section on the end face side, and comprising a piston face, which is arranged in the first wall section, and a sealing structure, which lies opposite the piston face, and which by means of a pressurized medium, which acts upon the piston face, can be pressed against a sealing section of the second wall section which is arranged on the end face side.

The invention starts from the knowledge that a displaceable blocking element, which extends transversely into the gap, can constantly effectively prevent the penetration of hot gas, even though on account of operation-dependent thermal expansions the wall sections, which lie opposite each other on the end faceside, can move away from each other or move towards each other and can vary the gap in its size. So that the blocking element can achieve a best possible sealing of the varying gap, the blocking element is displaceable in relation to the first wall section so that by its sealing structure it can be constantly pressed against a sealing section of the second wall section which is arranged on the end face side. The pressing-on pressure which is necessary for this is created by a pressurized medium which can be fed to a piston chamber which is located in the first wall section. The blocking element projects by its piston face into the piston chamber so that the pressurized medium can act upon the piston face, and consequently the blocking element can follow up, constantly bearing against the sealing section.

Thus, the invention turns away from the method in which the penetration of hot gas into the gap is prevented only by blowing out sealing air.

On account of the displaceability of the blocking element inside the first wall section, transversely to the gap and into the gap, such a gap blocking device of the gas turbine can effectively seal the gap at any time, despite variable gap dimensions.

Moreover, sealing air can be saved and instead of for blocking the gap can additionally be made available to the combustion process of the gas turbine, which further increases the efficiency during operation of the gas turbine. Furthermore, the combustion stability can be improved as a result.

Advantageous developments are disclosed in the dependent claims.

The sealing structure of the blocking element and the sealing section, which is provided on the second wall section on the end face side, preferably lie flat against each other. As a result of this, the sealing action of the blocking element is further increased, which further impedes the penetration of hot gas.

In an advantageous development, the two adjacent wall sections are part of a passage wall which is annular in cross section. Therefore, the gap is with encompassing effect in the circumferential direction. This enables an encompassing gap blocking device, in which the piston face, the sealing structure and the piston chamber are expediently annularly formed in each case so that at any point of the gap an especially effective provision for preventing the penetration of hot gas into the gap can be ensured.

An especially reliable and effective gap blocking device is achieved if the blocking element closes off a piston chamber, which is arranged in the first wall section, by means of a slide ring, which is provided between the blocking element and the first wall section, in order to enable or to improve the pressure build-up which is necessary for the displacement. Since compressor air is preferably used as pressurized medium, the required pressure can consequently be especially simply made available without reducing the efficiency of the gas turbine or its combustion stability. An especially effective slide ring comprises at least one seal-point which is provided on the blocking element or in the first wall section.

BRIEF DESCRIPTION OF THE DRAWINGS

The invention is explained in more detail with reference to a drawing. In the drawing.

DETAILED DESCRIPTION OF INVENTION

Figure 1:
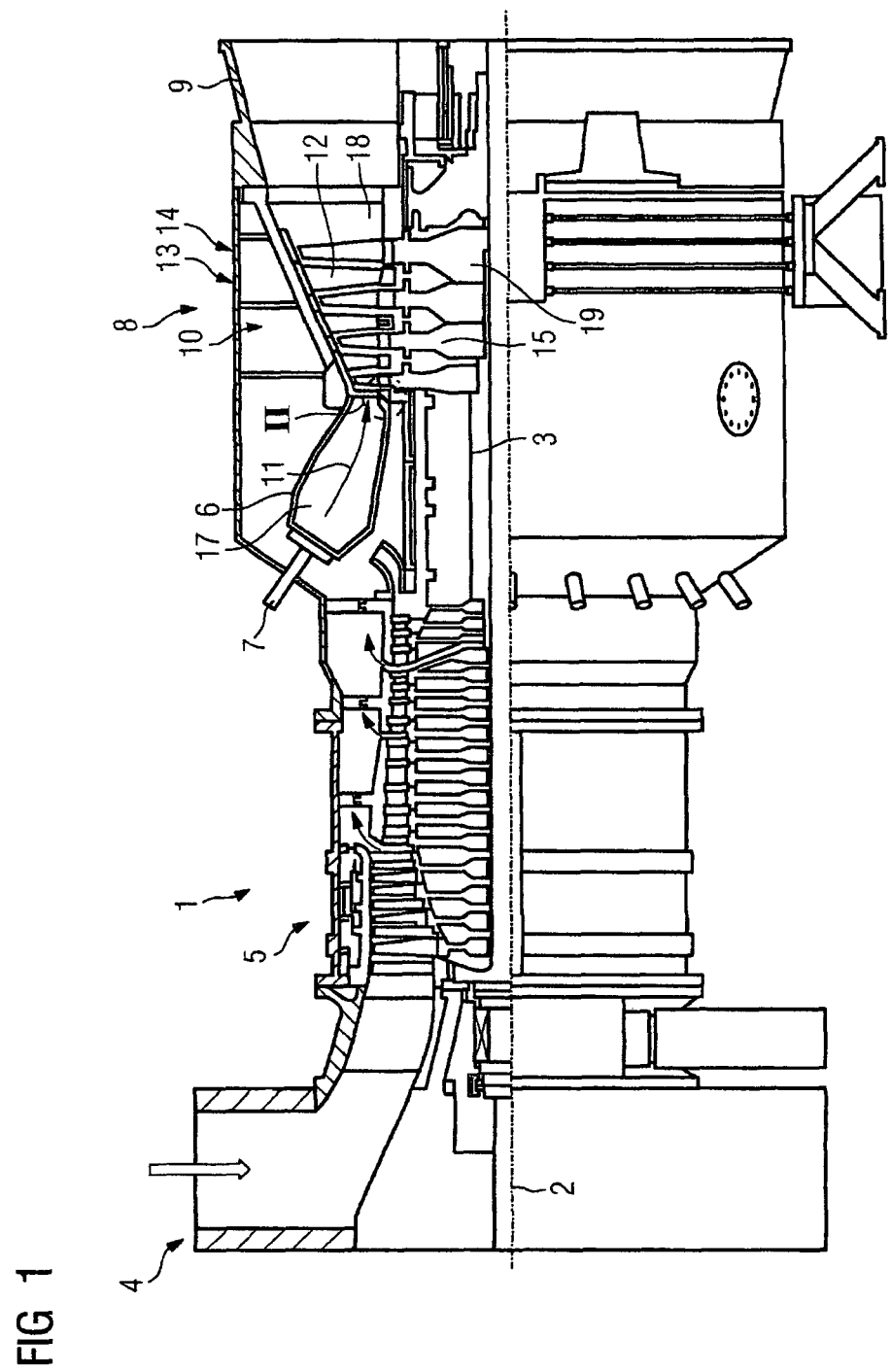
FIG. 1 shows a gas turbine in a longitudinal partial section.

FIG. 1 shows a gas turbine 1 in a longitudinal partial section. Inside, it has a rotor 3, which is also referred to as a turbine rotor and which is rotatably mounted around a rotational axis 2. An intake duct 4, a compressor 5, a toroidal annular combustion chamber 6 with a plurality of burners 7 which are arranged rotationally symmetrically to each other, a turbine unit 8, and an exhaust duct 9, are arranged in series along the rotor 3. The annular combustion chamber 6 forms a combustion space 17 which communicates with an annular hot gas passage 18. Four turbine stages 10, which are connected one behind the other, form the turbine unit 8 there. Each turbine stage 10 is formed from two blade rings. In the hot gas passage 18, a row 14 which is formed from rotor blades 15 follows a stator blade row 13 in each case, as seen in the flow direction of a hot gas 11 which is produced in the annular combustion chamber 6. The stator blades 12 are fastened on the stator, whereas the rotor blades 15 of a row 14 are attached on the rotor 3 by means of a turbine disk. A generator or a driven machine (not shown) is coupled to the rotor 3.

Figure 2:
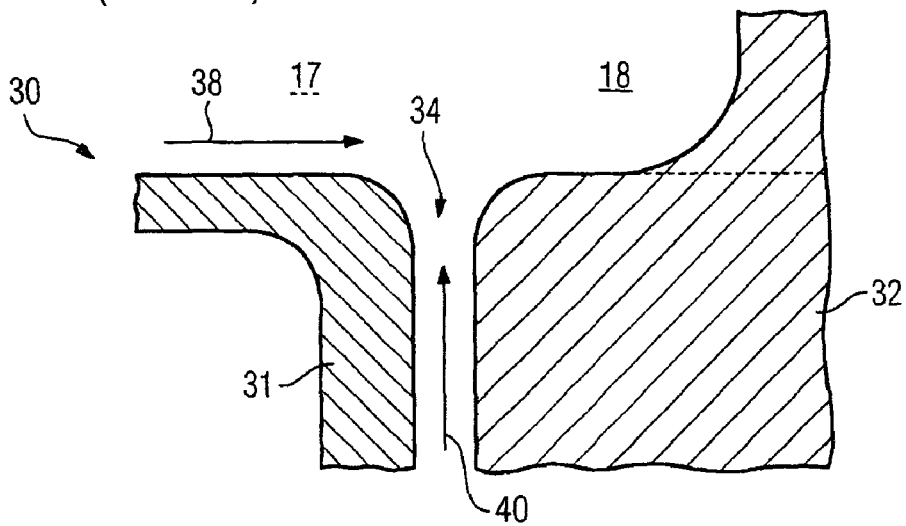
FIG. 2 shows the detail II from FIG. 1, the transition region of an annular combustion chamber into a hot gas passage of the turbine according to the prior art.

FIG. 2 shows as a detail a passage wall 30 which delimits a flow, with two adjacent wall sections 31, 32 which lie opposite each other on the end face side, forming a gap 34. The wall sections 31, 32 of the passage wall 30 guide a hot gas flow 38. According to detail II of FIG. 1, there is such an arrangement in the transition region from the combustion space 17 of the annular combustion chamber 6 of the gas turbine 1 to the annular hot gas passage 18 of the turbine unit 8. The first wall section 31 can be a ceramic or a metal heat shield, whereas the second wall section 32, for example, can be formed by a platform of the stator blade 12 of the first turbine stage 10.

In order to block the gap 34 against entry of hot gas 11, in the prior art only sealing air 40 at increased pressure is blown out of the gap (FIG. 2).

Figure 3:
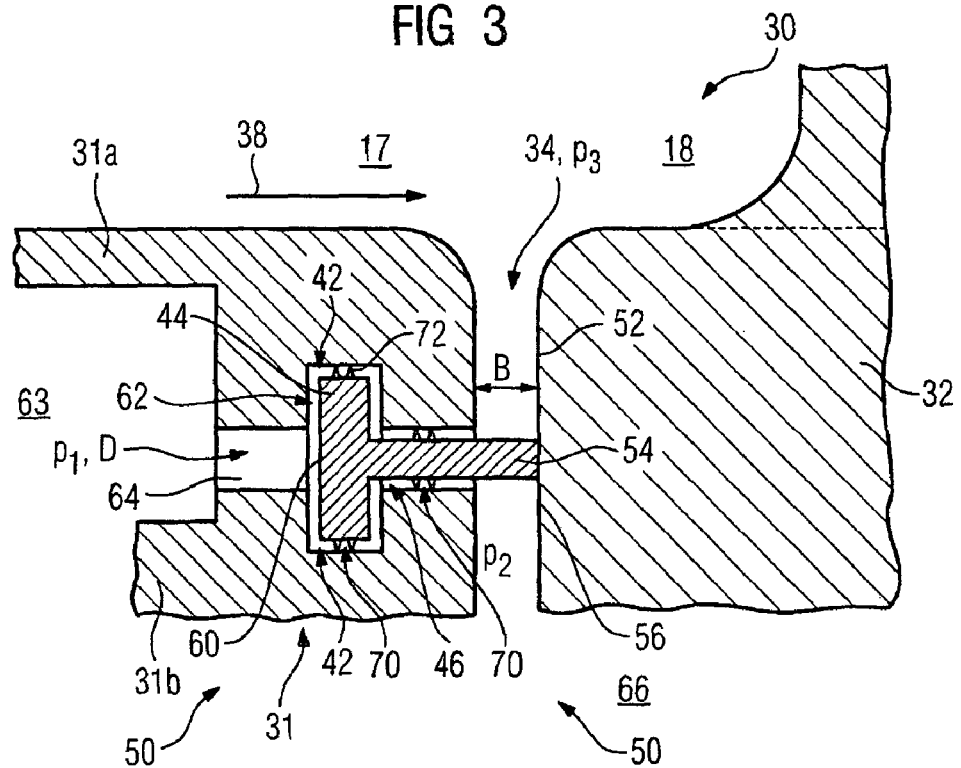
FIG. 3 shows a gap blocking device according to the invention, with a piston-like blocking element in cross section.

FIG. 3 shows a gap blocking device 50 according to the invention for the passage wall 30 which guides the hot gas flow 38 in a delimiting manner. The first wall section 31 is split on the end face side into two partial elements 31a, 31b by means of a joint 46 which extends parallel to the hot gas flow 38 and is provided with slots 42, in order to at least partially accommodate therein a blocking element 44 which is displaceable parallel to the hot gas flow 38 and into the gap 34. The slot 42 can be produced in the wall section 31 by milling, wherein the blocking element 44 then has to be inserted in the circumferential direction.

Figure 5:
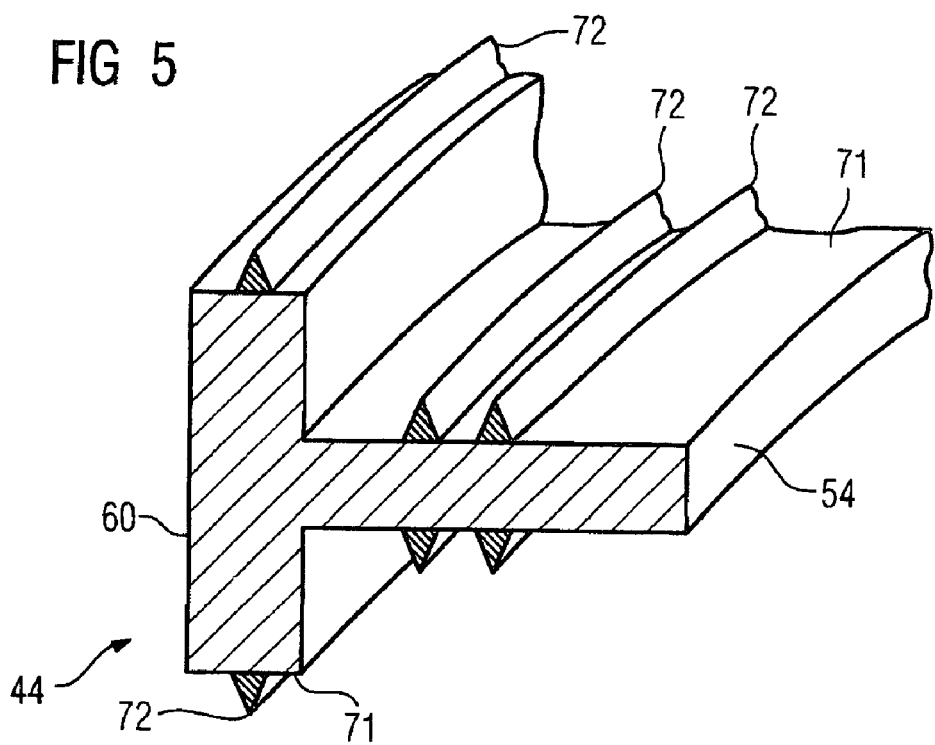
FIG. 5 shows a piston sealing element as a blocking element in perspective view.

The blocking element 44 (FIG. 5), which is piston-like or hammer-like in cross section and which is annularly encompassing in the example which is shown, has a sealing structure 54 which is arranged on the gap side and which lies opposite a sealing section 56 which is arranged in the end face 52 of the second wall section 32.

Furthermore, the blocking element 44 comprises a piston face 60 which corresponds to the cross section of the piston chamber 62 which is provided in the first wall section 31 between the two partial elements 31a, 31b. A pressurized medium D, preferably final air from the compressor, can be fed to the piston chamber 62 from the rear side 63 of the wall section 31 via a gap-form or hole-form feed passage 64, which pressurized medium customarily impinges anyway upon the wall section 31, which for example is constructed as a metal heat shield, for its cooling on the rear side with regard to the hot gas. As a feed passage 64, for example the joint 46 can also be used.

With the so-proposed application of the gap blocking device 50 in the gas turbine 1, the blocking element 44 is displaceable in the axial direction of the rotor 3. On account of the operation-dependent temperature fluctuations, the wall sections 31, 32, which are associated with the gap, move and/or expand so that the end face distance between the two wall sections 31, 32, which is the gap dimension B, can vary. For example, after starting the cold gas turbine, the gap is reduced on account of temperature expansions. The variation of the gap dimension B in this case can be so large that purely static or even flexible sealing elements are not in the position to permanently compensate the movements of the wall sections while maintaining an adequate leakproofness.

In order to achieve a reliable sealing of the gap 34 for each point in time during operation, the blocking element 44, as a sealing element, can be pressed against the sealing section 56 of the second wall section 32.

The pressing-on pressure which is required for this is achieved by the pressurized medium D which can be fed to the displaced volume or piston chamber 62 via the feed passage 64, and within this acts upon the piston face 60 of the blocking element 44 for its displacement in the direction of the opposite wall section 32.

The pressure $p_1$ of the pressurized medium D is selected so that this is greater than the pressure $p_2$ or $p_3$ which occurs in the gap. Consequently, it is possible that the blocking element 44 which is arranged in the joint 46, in the fashion of a piston which is movable in the slot 42, is partially displaced under pressure from the first wall section 31 in the direction of the second wall section 32, so that its sealing structure 54 bears constantly tightly, preferably flat in this case, against the sealing section 56 during operation. The pressure difference between gap 34 and piston chamber 62 therefore ensures a seal which adapts itself to the gap size or to the gap dimension B as long as the displacement travel, which is dependent upon the size of the piston chamber 62, has been selected sufficiently large.

The passage wall 30 separates the hot gas flow 38 in relation to a rear chamber 66 in which cooling air can be guided. The cooling air has the pressure $p_2$ which is preferably lower than that of the pressurized medium D which is used for the following up of the blocking element 44, but is higher than the pressure $p_3$ of the hot gas 11 in the gap 34 on the hot gas side. If between sealing structure 54 and sealing section 56 an insignificant or even significant leakage still occurs, a leakage flow can flow from the chamber 66 through the gap 34 due to the selected pressure ratios, which in a supporting manner effectively prevents the disadvantageous penetration of hot gas 11.

In order to achieve an especially low-consumption use of the pressurized medium D, the blocking element 44 is mounted with a slide ring 70 in the first wall section 31. The slide ring 70 at least partially closes off the piston chamber 62 in relation to the gap 34, and comprises seal-points 72 which can be provided either on lateral surfaces 71 of the blocking element 44, like it is to be seen in perspective view in FIG. 5, or can be provided on inner surfaces 74 of the wall section 31 which lie opposite these lateral surfaces. An undesirably or impermissibly large leakage of pressurized medium D, which flows from the piston chamber 62, unused, into the gap 34, can therefore be avoided.

Figure 4:
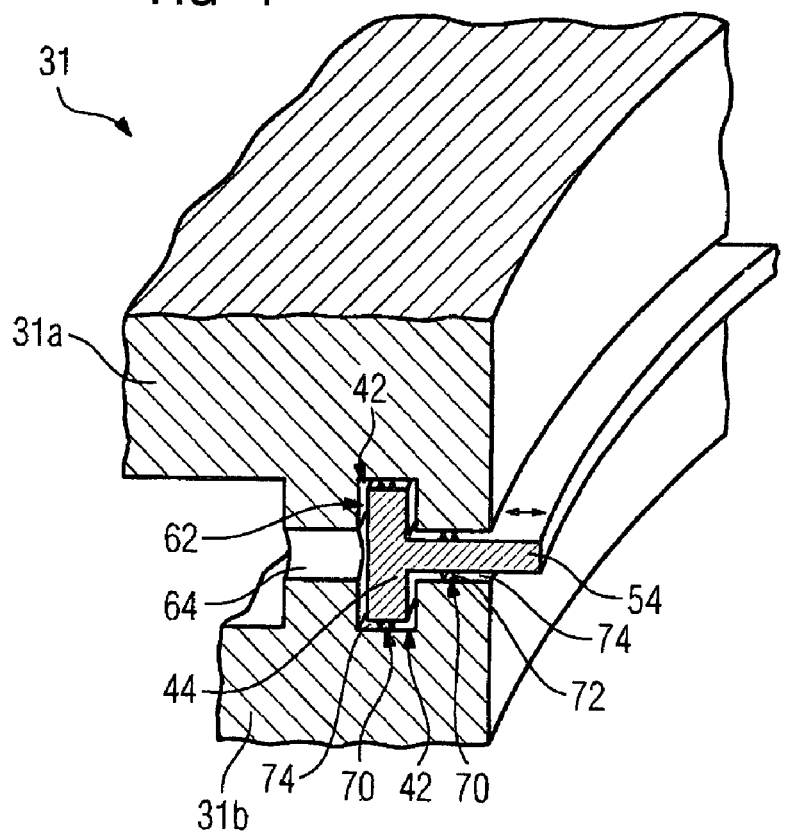
FIG. 4 shows a first wall section, with the piston-like blocking element in perspective view.

As also emerges from the perspective partial view of FIG. 4, the two wall sections 31, 32 can be at least part of a passage wall 30 which annularly encompasses in the axial cross section, which, for example, defines the transition from an annular combustion chamber 6 into the hot gas passage 18 of the gas turbine 1, preferably in the region of the detail II which in FIG. 1 is identified by II. In the circumferential direction, both the wall sections 31, 32 of the annular passage wall 30 and the blocking element 44 can be segmented. In addition, other fields of application are conceivable inside the gas turbine, for example on the transition regions between platforms of stator blades and the guide rings which are arranged axially adjacent to them and which lie opposite rotor blades.

Consequently, by the invention a seal or blocking device, which is adjusted by means of the pressure-operated blocking element, is created for a gap, and is automatically adjusted to a variable gap size in order to reduce the leakage volumes of sealing air which protect the gap against hot gas entry.

The invention claimed is:

1. A gas turbine, comprising:
a passage wall to delimit a flow, wherein the passage wall has a first wall section and an adjacent second wall section, wherein the first wall sections is part of a combustion chamber of the gas turbine, and the second wall sections is part of an annular hot gas passage of a turbine unit;
a gap, wherein the adjacent wall sections lie opposite each other on the end face side, forming the gap;
a blocking element for sealing the gap, wherein the blocking element extends into the gap and is displaceable transversely to the gap, wherein the blocking element projects from the first wall section on the end face side, wherein the blocking element has a piston face guided in the first wall section and a sealing structure opposite to the piston face, wherein the sealing structure is pressed against a sealing section of the second wall section arranged on the end face side based upon a pressurized medium acting on the piston face.

2. The gas turbine as claimed in claim 1, wherein the sealing structure of the blocking element and a sealing section of the end face of the second wall section lie flat against each other.

3. The gas turbine as claimed in claim 1, wherein the two adjacent wall sections are part of a passage wall which is annular in cross section.

4. The gas turbine as claimed in claim 2, wherein the two adjacent wall sections are part of a passage wall which is annular in cross section.

5. The gas turbine as claimed in claim 1, wherein the blocking element closes off a piston chamber arranged in the first wall section by means of a slide ring provided between the blocking element and the first wall section.

6. The gas turbine as claimed in claim 5, wherein the slide ring ensures in a low loss manner the pressure build-up, with regard to the pressurized medium required for the displacement for pressing against the sealing section.

7. The gas turbine as claimed in claim 1, wherein the piston face is annularly formed.

8. The gas turbine as claimed in claim 7, wherein the sealing structure is annularly formed.

9. The gas turbine as claimed in claim 8, wherein the piston chamber is annularly formed.

10. The gas turbine as claimed in claim 6, wherein the slide ring comprises at least one seal-point provided on the blocking element or in the first wall section.

11. A gas turbine, comprising:
a gap between a first wall section of a combustion chamber of the gas turbine and a second wall section of an annular hot gas passage of a turbine unit, and
a blocking element to seal the gap, wherein the blocking element extends into the gap, and wherein the blocking element is displaceable transversely to the gap,
wherein the blocking element is guided in the first wall section, and
wherein the blocking element is pressed to the second wall section based on a pressurized medium acting on the blocking element.

12. The gas turbine as claimed in claim 11, wherein the blocking element projects from the first wall section.

13. The gas turbine as claimed in claim 11, wherein a sealing structure of the blocking element lies flat on the second wall section.

14. A gas turbine, comprising:
a gap between a first wall section of a combustion chamber of the gas turbine and a second wall section of an annular hot gas passage of a turbine unit, and
a blocking element to seal the gap, wherein the blocking element extends into the gap, and wherein the blocking element is displaceable transversely to the gap,
wherein the gap is annular in cross section, and
wherein the blocking element closes off a piston chamber arranged in the first wall section with a slide ring between the blocking element and the first wall section.

* * * * *